United States Patent Office 3,436,500
Patented Apr. 1, 1969

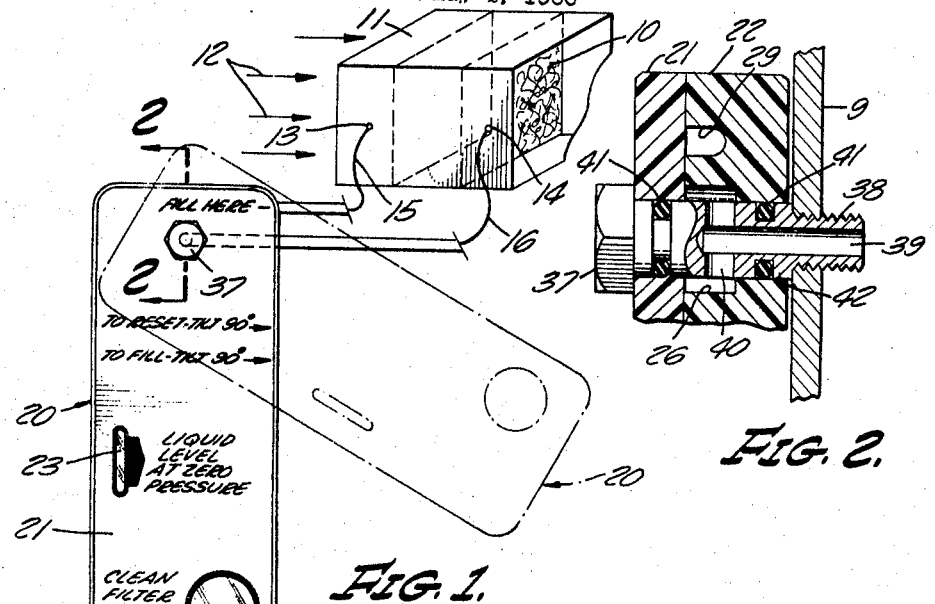
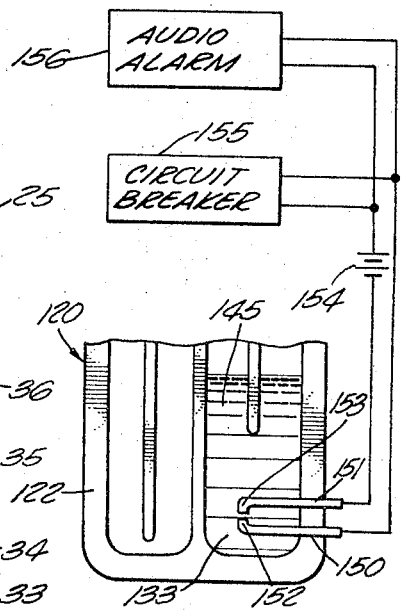
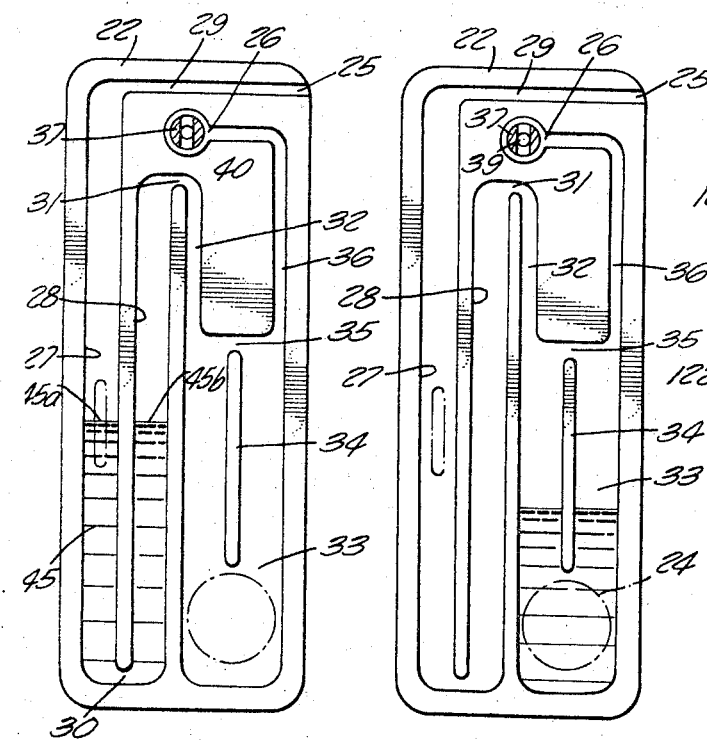

3,436,500
RESETTABLE DIFFERENTIAL PRESSURE INDICATOR
Robert M. Culbert, Manhattan Beach, and Clifton C. Mugford, Palos Verdes, Calif., assignors to Farr Company, El Segundo, Calif., a corporation of California
Filed May 2, 1966, Ser. No. 546,810
Int. Cl. H01h 29/28; G01l 7/18
U.S. Cl. 200—81.6      14 Claims

ABSTRACT OF THE DISCLOSURE

A device for indicating the attainment of a preselected differential pressure between two points, as on either side of an air filter, wherein the device housing has a vertical U-shaped tube portion partially filled with liquid and exposed on either side to the two pressures and there is an indicating chamber on the lower pressure side of the tube for receiving and containing the liquid upon occurrence of the pressure differential. The housing is pivotable to flow the liquid from the chamber back into the tube portion for resetting the device.

---

This invention relates to a device for providing an indication of the occurrence of a preselected pressure differential between two pressure sources and, in particular, is directed to such a device which continually monitors the pressures and produces a permanent indication that such pressure differential has occurred although the device is readily resettable for a renewed check of the pressure differential.

There are numerous fluid circulating systems, machines, processes, etc. wherein the physical characteristics occurring at two different locations are critically related to each other and it is desirable to produce an indication of the occurrence of an excessive differential between such characteristics. By way of example and without implying a limitation as to possible uses of the device of this invention, one such situation is encountered in determining the effective and efficient operation of a filter in an air circulating system wherein an excessive pressure drop across the filter evidences the necessity of cleaning or replacing the filter. Every air filtering installation is adapted to operate properly within a given range of pressure differentials between the upstream and downstream sides of the filter and it is highly desirable to have available an indication of whether the actual pressure differential has exceeded the proper range. In some installations this is critical to the proper operation. Moreover while it is desirable to have a continuous indication that the pressure differential has, at some time, been exceeded, it is also desirable to be able to readily recheck whether that pressure differential is being exceeded under all conditions or just an occasional abnormal occurrence.

The heretofore conventional devices for accomplishing this pressure differential indication have been unsatisfactory for many purposes as either lacking in sensitivity or being excessively complex and expensive. While many conventional manometer type indicators may be sufficiently sensitive and not excessively expensive, the proper use of such devices requires special training and the devices are not adaptable for the rugged field service required.

Thus it is the principal object of this invention to provide an extremely accurate and yet simple differential pressure indicating device wherein the two pressures to be compared are applied to the respective upper ends of two vertical passages joined at their lower ends and partially filled with a liquid and the occurrence of the excessive pressure differential causes the liquid to pass upwardly in one passage and into an adjacent chamber where it may be observed thereby producing the desired indication.

Another object of this invention is to provide a novel form of differential pressure indicating device comprising a housing having passageways and chambers therein selectively filled with a liquid which is caused to migrate from one portion of the housing to another portion of the housing upon occurrence of excessive pressure differential where it may be observed, and wherein physical manipulation of the housing readily returns the liquid to the original location for renewed measurement of the pressure differential.

Still another object of this invention is to provide a novel form of differential pressure indicator comprising a housing pivotally mounted to hand downwardly for normal pressure differential measuring by means of a liquid present therein and pivotable to a horizontal attitude for resetting the device by causing the liquid to pass from one portion of the device to another.

A further object of this invention is to provide a novel form of differential pressure indicating device wherein a charge of liquid within the device is caused to pass into a chamber upon occurrence of the preselected pressure differential and means within such chamber respond to the presence of the liquid to close an electrical circuit thereby sounding an alarm or causing some other safety operation. A more detailed object of this invention is to provide such a device wherein the liquid is electrically conductive and the means within the chamber are spaced electrical contacts.

Other and more detailed objects and advantages of this invention will appear from the following description and the accompanying drawings, wherein:

FIGURE 1 is an elevation view of the differential pressure indicating device of this invention diagrammatically shown as connected to the upstream and downstream sides of an air filtering assembly with the device of this invention also illustrated in phantom lines as being moved toward the attitude for resetting the device.

FIGURE 2 is a fragmentary sectional elevation taken substantially on the line 2—2 in FIGURE 1 and illustrating the pivotal mounting of the device.

FIGURE 3 is an elevation view of the device with the cover removed for illustrating the passages within the device and showing the liquid in the charged condition of the device at zero differential pressure.

FIGURE 4 is a view similar to FIGURE 3 and showing the liquid in the condition evidencing the occurrence of an excessive pressure differential.

FIGURE 5 is a fragmentary view similar to FIGURE 4 and illustrating a modified arrangement for automatically evidencing the occurrence of the excessive pressure differential.

Referring now to FIGURE 1, an air filter 10 is diagrammatically shown as mounted within a housing 11 through which air is flowing in the direction of arrows 12 whereby a pressure drop will occur across the filter 10. Through design and previous experience it will be known that when the pressure differential across the filter 10 reaches a particular magnitude the filter must be either cleaned or replaced, as is appropriate with that type of filter. In this particular illustration of a use for the device of this invention, the pressure differential indication to be produced by the device will be preselected to that particular magnitude. By way of illustration of a typical installation, an opening or port 13 is provided in housing 11 on the upstream side of filter 10 for sensing the pressure at that location, a port 14 is provided in housing 11 on the downstream side of filter 10 for sensing the lower pressure occurring at that location, and conduits 15 and 16 extend from ports 13 and 14 respectively to the differential pressure indicating device, generally designated 20, of this invention. It will readily appear to those skilled in the art that the device 20 may be similarly employed to indicate any type of comparative pressure differences produced at two locations such as ports 13 and 14 whether that pressure is directly generated in the particular equipment or is generated by appropriate transducers or sensors.

The differential pressure indicating device 20 includes a housing comprised of a cover plate 21 permanently or removably mounted on a body 22 and such mounting can be accomplished in any convenient manner so long as it provides a fluid tight juncture therebetween. The housing cover 21 includes transparent windows 23 and 24 at specific locations for observing the interior of the housing for purposes which will hereinafter become apparent. The housing body 22 includes an inlet port 25 adapted for connection to the higher pressure source, such as through conduit 15. An outlet port 26 of rather unique construction which will be fully described hereinafter is provided in housing body 22 for connection to the lower pressure source, such as through conduit 16. The designation of ports 25 and 26 as "inlet" and "outlet" ports is not intended to infer that a fluid continually passes through the device in this direction, although it will under certain conditions, but rather that this is the relative arrangement of the higher and lower pressure sources.

The device 20 is normally positioned in a vertical attitude as illustrated in FIGURES 1, 3 and 4. The elongated housing body 22 is provided with a pair of adjacent passageways 27 and 28 which extend vertically with the device so positioned for operation. The upper end of passageway 27 is connected through a smaller passageway 29 to the inlet port 25 since, for reasons that will become apparent, it is preferred that the inlet port 25 be on the opposite lateral side of the device as the passageway 27 to which it communicates. The lower ends of the passageways 27 and 28 are connected by an opening 30 thereby forming substantially a U-shaped tube arrangement within the body. The upper end of passageway 28 is connected through a lateral opening 31 to a downwardly extending port 32, located on the opposite side of passageway 28 as is the location of passageway 27. In the figures passageway 27 is on the left of passageway 28 with passageway 32 on the right. Passageway 32 opens into an enlarged chamber 33 which is also positioned laterally of the passageways 27 and 28. A baffle 34 is positioned in chamber 33 but is spaced both a substantial distance from the bottom of the chamber and a small distance at 35 from the top of the chamber. Another passageway 36 extends from the upper right hand extremity of chamber 33 to the outlet port 26 thereby completing the internal passages, ports and chambers of the housing body 22.

Referring more particularly to FIGURE 2, an arrangement for both mounting the device and providing a connection to the outlet port 26 is illustrated. A bolt 37 is threaded on one end 38 for threaded attachment to any convenient vertical wall 9 and is provided with an internal bore 39 opening at its lower end for connection to the lower pressure source, such as conduit 16. A lateral aperture 40 in bolt 37 communicates the bore 39 with the encircling outlet port 26 in the housing body 22. A pair of O-ring seals 41 on the bolt 37 on either side of the aperture 40 serve to seal the bolt with the housing. The shank 42 of the bolt 37 is of a larger diameter than the threaded section 38 and of a length slightly greater than the thickness of the combined housing cover 21 and body 22 whereby the housing is pivotally supported on the wall 9 and yet sealably connected to the bolt 37. The fit between the bolt 37 and the housing may be such as to preclude random swinging of the device 20 or conventional spring washers (not shown) may be provided to inhibit such swinging. As thus mounted, the device 20 is normally positioned in a vertical attitude but may be readily pivoted as required.

A liquid 45 is provided in the device 20 and, in the originally charged condition and normal operating conditions, the liquid 45 occupies portions of passageways 27 and 28. The liquid 45 may be conveniently introduced into the device through inlet port 25 with the device pivoted to a more horizontal altitude as shown in the phantom lines in FIGURE 1. The original charge of liquid 45 only partially fills passageways 27 and 28 and preferably to a level approximately one-half of the height of passageway 28 when, as shown in the drawings, the passageways 27 and 28 are of about the same cross-sectional area. In other words the charge of liquid 45 is preferably of a quantity approximately equal to the volume of passageway 28 from the bottom opening 30 to the top lateral opening 31. The specific gravity of the fluid 45 is selected or appropriately prepared to produce a liquid pressure head in a column the height of passageway 28 (between bottom opening 30 and top lateral opening 31) equal to the desired magnitude of pressure differential to be indicated by the device. That is to say, the weight per unit volume of the fluid 45 is such as to produce a fluid pressure at the bottom of passageway 28 when the fluid fills passageway 28 equal to the maximum desired pressure drop across the filter 10.

During operation of the device 10 the higher source pressure is applied through port 25, passageway 29 and passageway 27 to the surface 45a of fluid 45 in passageway 27 and the lower source pressure is applied through outlet port 26, passageway 36, chamber 33, passageway 32 and finally passageway 28 to the surface 45b of the fluid in passageway 28. Under static conditions the fluid 45 assumes the condition illustrated in FIGURE 3 but under dynamic conditions with air flowing through the filter 10, the pressure on surface 45a will exceed the pressure on surface 45b thereby lowering the fluid level in passageway 27 and raising the fluid level in passageway 28. As the difference in the pressures applied to surfaces 45a and 45b approaches the maximum desired differential pressure the surface 45a will be approaching the bottom of passageway 27 and the surface 45b will be approaching the lateral outlet opening 31 from the upper end of passageway 28. As this maximum pressure differential is exceeded the fluid 45 will be forced upwardly in the passageway 28, through lateral opening 31 and downwardly through passageway 32 into chamber 33. The excessive pressure differential causes a complete transfer of the fluid from passageways 27 and 28 to chamber 33 as shown in FIGURE 4. In this condition the outlet port 26 communicates with the inlet port 25 permitting air to bleed thorugh the device. The transparent window 24 in housing cover 21 is positioned opposite the chamber 33 thereby permitting a visual observation of the presence of the liquid 45 in chamber 33. This visual observation may be enhanced by appropriately coloring the liquid 45 in any conventional manner.

In order to "reset" the device 20 from its condition in FIGURE 4 to the condition of FIGURE 3, it is merely necessary that the device be pivoted in a counterclockwise direction about the bolt 37 as shown in phantom lines in FIGURE 1 thereby causing the liquid 45 to pour through passageway 32 and opening 31 into passageways 28 and 27. A maximum of 90° of pivoting or slightly more is required to accomplish this resetting. It is to be noted that since both inlet port 25 and the passageway 36 leading to outlet port 26 are on the right hand side of the device the liquid will not pass therethrough and out of the device upon such 90° counterclockwise pivoting. This resetting operation may be accomplished as often as required such as for rechecking the occurrence of the predetermined maximum pressure differential or following the cleaning or replacing of the filter. However if over a period of time or through inadvertence the liquid 45 is partially or completely lost from the device, the charge of fluid may be replenished by pivoting the device 90° counterclockwise and introducing additional liquid through inlet port 25. The proper volume of liquid must be maintained in the device for proper operation. An insufficient quantity will produce a false indication of excessive pressure differential upon the occurrence of a less than excessive pressure differential by carrying the liquid into chamber 33. The presence of an excessive amount of liquid 45 will cause some of the liquid to pass into chamber 33 and be observable through window 24 although the excessive pressure differential has not been reached. The proper volume of the charge of liquid is contained in the device and may be visually verified when the liquid surface 45a is at the midpoint of the transparent window 23 under static conditions, that is, with equal pressure applied to the inlet and outlet ports 25 and 26. Thus in filling the device to the proper level, liquid is added through the inlet port 25 with the device tilted 90° and the device is pivoted back to the vertical position for checking the liquid level. Excessive liquid can be poured from the device by counterclockwise pivoting beyond the horizontal position whereby the charge of fluid proceeds from the upper end of passageway 27 through passageway 29 to the inlet port 25.

Referring now to the modified embodiment shown in FIGURE 5, the device, generally designated 120, is identical to the heretofore described device 20 with one exception. That exception is that a pair of electrodes 150 and 151 are mounted in the housing body 122 to extend through a side wall thereof into the chamber 133. The terminal ends 152 and 153 of the electrodes 150 and 151 are connected through wires to a source of electrical potential 154 and any desired operative components such as a circuit breaker 155 and an audio alarm 156. The charge of liquid 145 within the device 120, in addition to being adjusted to the proper specific gravity, is electrically conductive whereby the electrical circuit is completed through the liquid at the terminal ends 152 and 153 when the liquid 145 passes into chamber 133 upon occurrence of the excessive pressure differential. Completion of this circuit causes operation of the components 155 and 156 to the desired end. Thus this electrical circuit provides a substitute for the visual observation through window 24 of the afore-described device 20 and, moreover, provides an immediate indication of the occurrence of the excessive pressure differential.

Thus it may be seen that by this invention there is provided a uniquely simple but extremely accurate device for indicating the appearance of a predetermined pressure difference between two sources. That indication is permanent in the sense that it need not be observed at the time of its occurrence but will be apparent thereafter and yet the device may be quickly reset to permit further monitoring of the existence of the proper pressure differential. Finally it is to be noted that the device is responsive only to pressure differentials and that the magnitude of pressure differential to which it responds may be readily adjusted by a mere change in the specific gravity of the liquid employed.

We claim:

1. A resettable differential pressure indicating device responsive to two fluid pressure sources, comprising: a housing having a pair of connections for the two pressure sources, a pair of vertical passageways provided in said housing with the lower ends of said passageways connected for fluid communication, a chamber in said housing, one of said passageways communicating with one of said pressure source connections, the other of said passageways communicating with both said chamber and the other said pressure source connection, a volume of liquid partially filling said passageways of a preselected specific gravity in relation to the vertical height of said other passageway to produce a predetermined liquid pressure head therein, means for observing the presence of said liquid in said chamber upon passage from said passageways thereto upon occurrence of the pressure differential to be indicated, said chamber having a volumetric capacity greater than the volume of liquid for receiving and containing all of said liquid, and means mounting said housing for selective movement to a position for flowing the liquid from said chamber back to said passageways for resetting.

2. The device of claim 1 wherein the higher of the two pressure sources is applied to the said connection communicating with said one passageway.

3. The device of claim 1 in which the pressure differential to be indicated is of a magnitude equal to the liquid pressure head formed by said liquid of that specific gravity filling said other passageway to the height whereupon it will flow into said chamber.

4. The device of claim 1 in which said liquid only partially fills said passageways and is substantially equal in volume to the volume of said other passageway between the connection with the said one passageway and the connection with said chamber.

5. The device of claim 1 in which electrically responsive means are provided in said chamber for closing an electrical circuit upon said liquid passing into said chamber.

6. The device of claim 5 wherein said electrically responsive means includes a pair of spaced electrodes and said liquid is electrically conductive.

7. A resettable differential pressure indicating device for producing an indication of the occurrence of a fluid pressure difference of a predetermined magnitude between two fluid pressure sources, comprising: a housing having a pair of ports adapted for connection to the respective pressure sources, a pair of vertical passageways integrally formed in said housing with the lower ends of said passageways connected for fluid communication, a chamber integrally formed in said housing, one of said passageways having an upper end communicating with one of said ports, the other of said passageways having an upper end communicating with both the other said port and said chamber, a volume of liquid partially filling said passageways and of a preselected specific gravity in relation to the height of the upper end of the said other passageway above said connection of the lower ends the passageways to produce a liquid pressure head in said other passageway equal to such magnitude of pressure differential desired to be indicated, said chamber having means for observing the presence of said liquid therein upon passage from said passageways thereto, said chamber having a volumetric capacity greater than the volume of liquid for receiving and containing all of said liquid, and means mounting said housing for selective movement to a position for flowing the liquid from said chamber back to said passageways for resetting.

8. The device of claim 7 in which said other passageway communicates with the port connected to the lower of the two pressure sources and that said communication is by means of circuitous passages integrally formed in said housing opening into said chamber for causing the said liquid to pass into said chamber rather than out that said port upon occurrence of excessive differential pressure.

9. The device of claim 7 in which said housing is relatively flat and rectangular with said passageways extending the length thereof and positioned laterally adjacent each other, and said chamber is formed laterally adjacent said other passageway.

10. A differential pressure indicating device for producing a permantly, though resettable, indication of the occurrence of a fluid pressure difference of a predetermined magnitude between two fluid pressure sources, comprising; an elongated rectangular housing having ports at one end adapted for connection to the pressure sources, means for mounting said housing for pivotal movement about a horizontal axis with said housing normally oriented with said one end uppermost, a pair of vertical passageways provided in said housing extending downwardly from said one end to nearly the other end with the lower ends of said passageways connected for fluid communication, a chamber in said housing laterally of said passageways in one of the directions of pivotal movement, said passageways having the upper ends connected to said ports, one of said passageways having the upper end at a predetermined height above said passageway connection and communicating with said chamber, a liquid partially filling said passageways and of a preselected specific gravity in relation to the said height of the upper end of the said one passageway to produce a liquid pressure head in said other passageway equal to such magnitude of pressure differential desired to be indicated, said chamber having means for observing the presence of said liquid therein upon passage from said passageways thereto, and pivoting of said housing in one direction causing said liquid to pass from said chamber to said passageways for resetting the device.

11. The device of claim 10 wherein said passageways are laterally adjacent each other and the said one passageway which communicates with said chamber is located between said chamber and the other passageway.

12. The device of claim 10 wherein the portion of said chamber required to accommodate the liquid is substantially below the said upper end of said one passageway.

13. The device of claim 10 wherein said pivotal mounting is at said one end and one of said ports is formed through said pivotal mounting.

14. A differential pressure indicating device for producing a permanent, though resettable, indication of the occurrence of a fluid pressure difference of a predetermined magnitude between two fluid pressure sources of respective higher and lower pressures, comprising; an elongated housing having an inlet port adapted for connection to the higher pressure source and an outlet port adapted for connection to the lower pressure source, means for mounting said housing near one end thereof for pivotal movement about a horizontal axis with said housing normally depending downwardly from said one end, said inlet and outlet ports located at said one end of the housing, a pair of vertical passageways provided in said housing extending downwardly from said one end to nearly the other end with the lower ends of said passageways connected for fluid communication, a chamber in said housing laterally of said passageways in one of the directions of pivotal movement, one of said passageways having an upper end connected to said inlet port, the other of said passageways having the upper end at a predetermined height above said passageway connection, said other passageway upper end being above said chamber, means connecting said outlet port to both said chamber and the said upper end of said other passageway, a liquid partially filling said passageways and of a preselected specific gravity in relation to the said height of the upper end of the said other passageway to produce a liquid pressure head in said other passageway equal to such magnitude of pressure differential desired to be indicated, said chamber having means for indicating the presence of said liquid therein upon passage from said passageways thereto, and pivoting of said housing in one direction causing said liquid to pass from said chamber to said passageways for resetting the device.

References Cited

UNITED STATES PATENTS

| | | | |
|---|---|---|---|
| 632,203 | 8/1899 | Rankine | 73—401 |
| 1,667,769 | 5/1928 | Callan | 73—401 XR |
| 1,916,427 | 7/1933 | Korver | 200—81.6 |

ROBERT K. SCHAEFER, *Primary Examiner.*

H. BURKS, *Assistant Examiner.*

U.S. Cl. X.R.

73—401